United States Patent
Eng et al.

(10) Patent No.: US 6,361,273 B1
(45) Date of Patent: Mar. 26, 2002

(54) HEAT SHIELD FOR A GAS TURBINE

(75) Inventors: Kynan Eng, Baden (CH); Christof Pfeiffer, Küssaberg (DE); Ulrich Wellenkamp, Windisch (CH)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 09/540,526

(22) Filed: Mar. 31, 2000

(30) Foreign Application Priority Data

Apr. 1, 1999 (DE) .......................... 199 15 049

(51) Int. Cl.$^7$ ................................ F01D 11/08
(52) U.S. Cl. ..................................... 415/173.1
(58) Field of Search ........................... 415/170.1, 173.1, 415/176, 178, 136, 138; 416/191, 192

(56) References Cited

U.S. PATENT DOCUMENTS

| | | | |
|---|---|---|---|
| 3,860,358 A | * 1/1975 | Cavicchi et al. | 415/173.1 |
| 3,864,056 A | 2/1975 | Gabriel et al. | |
| 5,071,313 A | 12/1991 | Nichols | |
| 5,205,708 A | * 4/1993 | Plemmons et al. | 415/173.1 |
| 5,641,267 A | * 6/1997 | Proctor et al. | 415/173.1 |

FOREIGN PATENT DOCUMENTS

| | | |
|---|---|---|
| DE | 1057827 | 5/1959 |
| DE | 2517044 C2 | 11/1975 |
| EP | 0 728 258 | 6/1998 |

* cited by examiner

Primary Examiner—Edward K. Look
Assistant Examiner—Ninh Nguyen
(74) Attorney, Agent, or Firm—Burns, Doane, Swecker & Mathis, L.L.P.

(57) ABSTRACT

A heat shield for a gas turbine, which heat shield encloses in particular the rotating blades of a stage of the gag turbine in an annular manner, consists of a plurality of heat-shield segments (13), which are arranged one behind the other in the circumferential direction, are curved in a circular-segment shape and are cooled from outside, and the longitudinal sides of which are designed as correspondingly curved rails running in the circumferential direction and possibly provided with recesses and having in each case a first arm (18) projecting in the axial direction, and which, for fastening to the casing of the gas turbine, are mounted with the first arms (18) in each case in an annular intermediate space (20) of constant width.

In such a heat shield, a mounting free of mechanical stresses is achieved owing to the fact that the first arms (18) have a width which varies in the circumferential direction, and is essentially equal to the width of the intermediate spaces at the end faces of the heat-shield segment (13) and decreases toward the center plane (16) of the heat-shield segment (13) in such a way that the heat-shield segment (13), during thermal loading, can stretch unhindered with its first arms (18) in a predetermined region in the intermediate spaces (20).

6 Claims, 3 Drawing Sheets

HEAT SHIELD FOR A GAS TURBINE

BACKGROUND OF THE INVENTION

The present invention relates to the technological field of gas turbines. It relates to a heat shield for a gas turbine, which heat shield encloses in particular the rotating blades of a stage of the gas turbine in an annular manner and consists of a plurality of heat-shield segments, which are arranged one behind the other in the circumferential direction, are curved in a circular-segment shape and are cooled from outside, and the longitudinal sides of which are designed as correspondingly curved rails running in the circumferential direction and having in each case a first arm projecting in the axial direction, and which, for fastening to the casing of the gas turbine, are mounted with the first arms in each case in an annular intermediate space of constant width.

2. Description of the Related Art

A heat shield in a gas turbine generally has the function of limiting the flow space for the hot gas and of protecting the casings and supporting structures of the gas turbine from the hot gas and an excessive heat input. To this end, it is necessary to cool the heat shield, as described, for example, in U.S. Pat. No. 3,864,056. The cooling, which is normally achieved by the flow of cooling air against the heat shield on the side remote from the hot gas, causes temperature differences in the heat shield and thus internal thermal stresses, which may subject the heat shield to excessive loading.

On account of the cooling, a temperature gradient results between the front side facing the hot gas and the heat-shield rear side to which cooling air is admitted. Consequently, the individual segments of the heat shield, which are curved in a circular-segment shape on account of the rotational symmetry of the gas turbine, attempt to stretch or "straighten". In order to limit the effect of the internal stresses resulting therefrom, it has been proposed, for example, in the publication U.S. Pat. No. 5,071,313 mentioned at the beginning, to make T-shaped slots in the laterally arranged fastening rails of the segments.

Another problem results from the thermally induced straightening or bending of the segments in connection with their mounting or fastening on the casing of the gas turbine. If the heat shield or its segments are prevented from straightening by the type of mounting, internal stresses build up, and these internal stresses may exceed the stability limits of the material used and may cause cracks. Experience with heat shields in various gas turbines has shown that the causes of cracks have often been internal stresses which have been caused by temperature differences. In order to avoid such a build-up of stresses, it has been proposed in EP-B1-0 728 258 to mount the segments of the heat shield on the casing by means of integrally formed hooks, first hooks being suspended with little play in the center of the segment, whereas second hooks are suspended at the ends of the segment with so much play that no mechanical stresses are produced by the suspension during the thermally induced stretching of the segments and the associated displacement of the second hooks.

However, the known mounting, subject to play, by means of the first and second hooks has various disadvantages: since the central fixing of the segments by the first hooks is not sufficient in order to fix the segments in their position as an entity, a band (62 in FIG. 2 of EP-B1-0 728 258) must additionally be inserted in order to hold the segments in a stable position. This requires considerable additional outlay during manufacture and installation of the heat shield.

SUMMARY OF THE INVENTION

The object of the invention is therefore to provide a (segmented) heat shield for a gas turbine, which heat shield avoids the disadvantages cited and in particular permits robust fastening of the segments in a simple construction and with ease of installation of the segments without substantially impairing the thermally induced straightening of the segments.

The essence of the invention consists in mounting the individual segments of the heat shield virtually free of play at their respective ends via rails which are continuous at the longitudinal sides, whereas sufficient play is provided in the center region, so that the center region can be displaced in the radial direction without impairment during the thermally induced straightening of the segments. In this case, the bearing points of the segments at the segment ends form pivot points for the stretching or straightening.

A first preferred embodiment of the heat shield according to the invention is characterized in that the intermediate spaces- in each case have an outer radius of curvature and an inner radius of curvature, in that the first arms, in the cold state of the heat-shield segment, in each case have an outer radius of curvature and an inner radius of curvature, and in that the two outer radii of curvature are essentially equal and the inner radius of curvature of the first arms is smaller than the inner radius of curvature of the intermediate spaces. Since in this embodiment the requisite play in the center region of the segments is produced by different radii of curvature, the segments can be machined to different radii of curvature in a simple manner with a grinding wheel. At the same time, steps or discontinuities in the marginal region of the segments at which unfavorable mechanical stress states may occur are avoided.

A preferred development of this embodiment is distinguished by the fact that the inner radius of curvature of the first arms is selected in such a way that, due to the thermally induced straightening of the heat-shield segment during heating to the operating temperature of the gas turbine, it changes into a radius of curvature which is approximately equal to the inner radius of curvature of the intermediate spaces. This advantageously achieves the effect that, in the cold state, the segment bears against the fastening with the entire outside of the first arms, whereas, in operation, i.e. after the thermally induced straightening, it bears against the fastening with the entire inside, so that all the forces between the segment and the fastening can always be transmitted over a large area.

BRIEF DESCRIPTION OF THE DRAWINGS

The invention is to be explained in more detail below with reference to exemplary embodiments in connection with the drawing, in which.

DETAILED DESCRIPTION OF THE PREFERRED EMBODIMENTS

Figure 1:
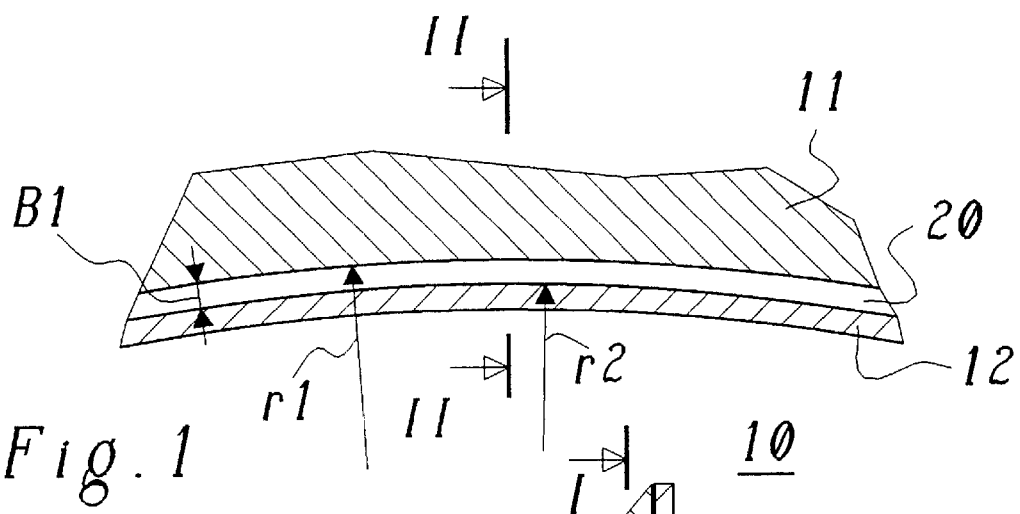
FIG. 1 shows a longitudinal section, i.e. a section transverse to the turbine axis, of the cutaway portion of an annular heat-shield carrier of a gas turbine, with a curved intermediate space, formed by a clamp, for mounting a heat-shield segment according to the invention.
Figure 2:
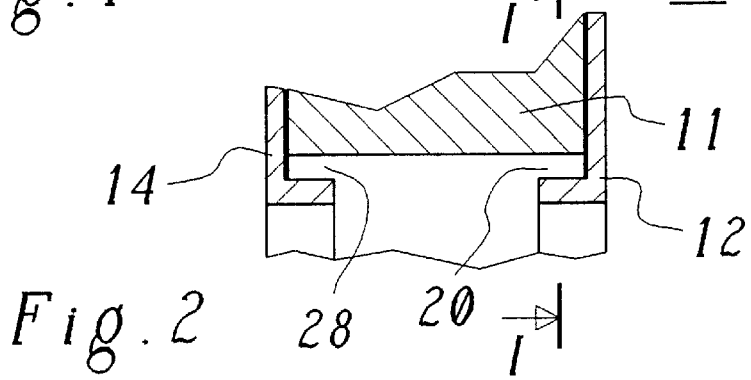
FIG. 2 shows the section through the arrangement according to FIG. 1 in the plane II—II.

A longitudinal section, i.e. a section transverse to the turbine axis (section plane I—I in FIG. 2), and a cross section (section plane II—II in FIG. 1) of the cutaway portion of an annular heat-shield carrier 11 of a gas turbine 10, with curved intermediate spaces 20 and 28, formed by laterally arranged clamps 12 and 14, for mounting or retaining a heat-shield segment according to the invention, are reproduced in FIGS. 1 and 2. The annular carrier 11, which is connected to the casing of the gas turbine 10 or may itself be part of the casing, surrounds a rotor part (not shown), fitted with moving blades, of the gas turbine 10, as shown, for example, in FIG. 1 of U.S. Pat. No. 5,071,313. The two clamps 12 and 14, which are arranged laterally on the carrier 11 and are designed as separate components in the present example, but may just as easily be an integral part of the carrier 11, engage under the carrier 11 from both sides with ends bent inward in an L-shape. The ends bent in an L-shape are at a distance from the inside of the carrier 11 and thus form the annular intermediate spaces 20 and 28, which have a constant width B1 and are defined by an outer radius r1 and an inner radius r2 (r1=r2+B1). The clamps 12 and 14 can be removed for installing the heat-shield segments. They are likewise segmented, in which case one clamp segment may be provided for one or more heat-shield segments.

Figure 3:
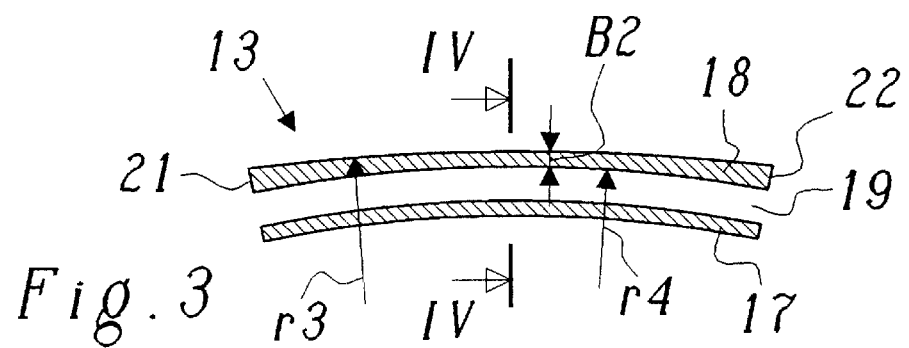
FIG. 3 shows a longitudinal section of the marginal region of a heat-shield segment in a preferred exemplary embodiment of the invention, this segment being intended for accommodating in the fastening device according to FIG. 1 or FIG. 2.
Figure 4:
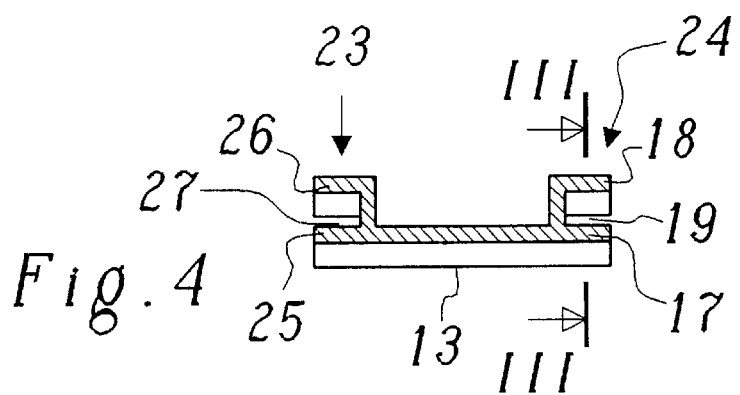
FIG. 4 shows a cross section through the heat-shield segment according to FIG. 3 in the plane IV—IV.

A heat-shield segment 13, as shown in FIGS. 3 and 4 in longitudinal section (section plane III—III in FIG. 4) and respectively in cross section (section plane IV—IV in FIG. 3), may now be inserted into the intermediate spaces 20, 28. The heat-shield segment 13 essentially comprises a rectangular plate curved in the longitudinal direction and made of a heat-resistant material, on the longitudinal sides of which (in a similar manner as in FIG. 3 of U.S. Pat. No. 5,071,313) rails 23, 24 are formed for fastening the segment in the carrier structure of FIGS. 1 and 2. The curved rails 23, 24, which may be provided with recesses, each have a top arm 18 or 26 respectively and a bottom arm 17 or 25 respectively, which extend outward parallel to one another and to the turbine axis from the longitudinal sides of the heat-shield segment 13. The top and bottom arms 18, 17 and 26, 25 respectively are in each case at a distance from one another, so that a curved slot 19 or 27 respectively, in which the clamps 12, 14 can engage with their ends bent in an L-shape, remains free between them. To form the heat shield (closed in an annular manner), an appropriate multiplicity of heat-shield segments 13 are fastened to the carrier 11 one behind the other in the circumferential direction.

Figure 5:
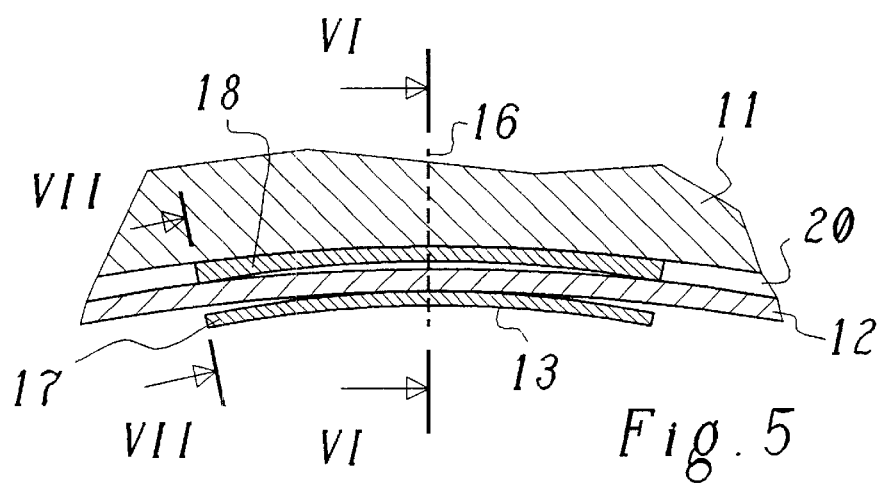
FIG. 5 shows a sectional representation of the fastening device according to FIG. 1 with inserted heat-shield segment according to FIG. 3 in the cold state.
Figures 6, 7:
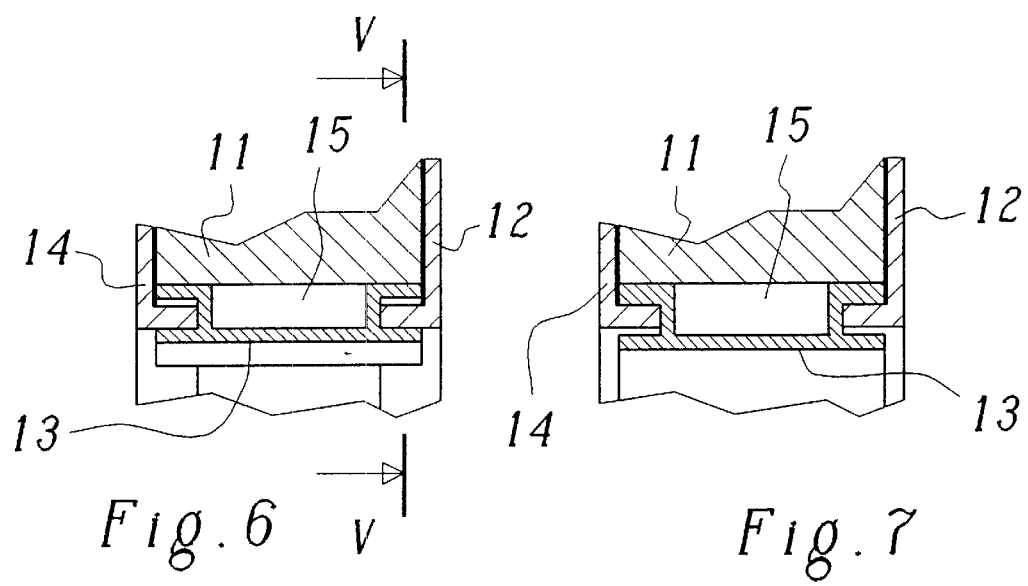
FIG. 6 shows the cross section through the arrangement according to FIG. 5 in the plane VII—VII.
FIG. 7 shows the cross section through the arrangement according to FIG. 5 in the plane VI—VI.
Figure 8:
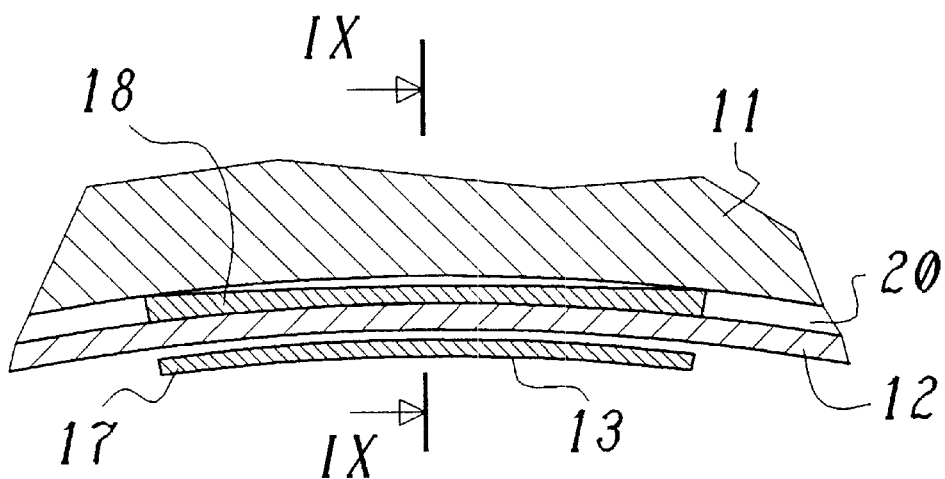
FIG. 8 shows a sectional representation of the fastening device according to FIG. 1 with inserted heat-shield segment according to FIG. 3 in the operating, hot state.
Figure 9:
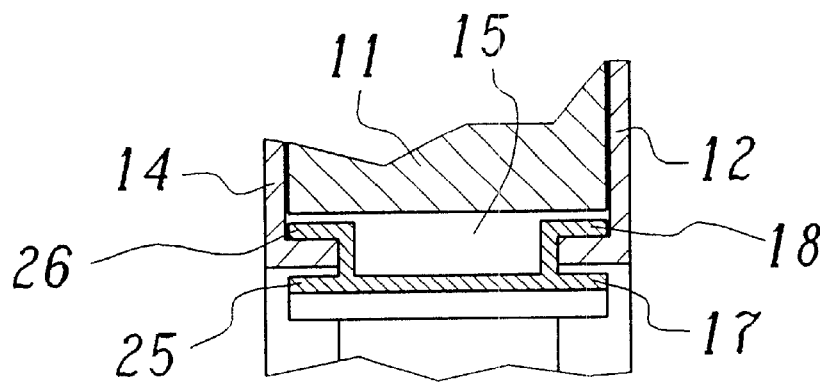
FIG. 9 shows the cross section through the arrangement according to FIG. 8 in the plane IX—IX.

The top arms 18, 26 in the rails 23, 24 of the heat-shield segments 13, within the scope of the invention, are now given a special configuration, which becomes clear if a heat-shield segment 13 fastened to the carrier 11 is considered, as reproduced in FIGS. 5 to 7. In this case, FIG. 5 shows the longitudinal section, comparable with FIGS. 1 and 3, through the arrangement (section plane V—V in FIG. 6 or center plane 16 of the heat-shield segment 13), FIG. 6 shows the cross section in the section plane VI—VI according to FIG. 5, and FIG. 7 shows the cross section in the section plane VII—VII according to FIG. 5. By comparing the width B2 (FIG. 3) of the top arm 18 of the heat-shield segment 13 with the (constant) width B1 of the intermediate space 20, it becomes clear that the width B2 is not constant and is approximately equal to the width B1 of the intermediate space 20, but that the width B2 is greatest at the end faces 21, 22 (FIG. 3) of the heat-shield segment 13 and decreases toward the center plane 16 and is at its minimum there. This is preferably achieved by the outer radius r3 (FIG. 3) of the top arm 18 (or 26 resp.) being selected to be approximately equal to the outer radius r1 of the intermediate space 20 (or 28 resp.), and by the inner radius r4 (FIG. 3) of the top arm 18 being selected to be markedly smaller than the inner radius r2 of the intermediate space 20. In this case, the outer radii r1 and r3 have reference to the same center, whereas the center for the inner radius r4 is displaced relative to the center for the inner radius r2 radially outward to such an extent that the (maximum) width B2 of the top arms 18, 26 at the end faces 21, 22 of the heat-shield segment 13 is approximately equal to the width B1 of the intermediate spaces 20, 28. This achieves the effect that the heat-shield segment 13 is held and mounted virtually free of play in the intermediate spaces 20, 28 at the two (opposite) end faces 21 22, whereas there is increasing play toward the center. The representation in FIGS. 5–7 relates to the cold state of the gas turbine. In the hot operating state, hot gas is admitted to the inside of the heat-shield segments 13, whereas cooling air flows into the cavity 15 (FIG. 6 or 7), formed between the heat-shield segment 13 and the carrier 11, for cooling the segments and strikes the outside of the segments. Due to this thermal loading, the heat-shield segments 13 "straighten" or stretch, as shown in the sectional representations 8 and 9 comparable with FIGS. 5 and 6. In the process, the edges, resting on the clamps 12, 14, at the end faces 21, 22 of the heat-shield segments 13 form two pivot points, while the segments are displaced radially inward at the center part. This stretching may proceed unhindered until the inner radius r4 of the top arms 18, 26 is equal to the inner radius r2 of the intermediate spaces 20, 28, as shown in FIG. 8. The inner radius r4 in the cold state may now preferably be selected in such a way that precisely the situation (r2=r4) shown in FIG. 8 is obtained at normal operating temperatures of the gas turbine. Then, due to the fastening, no additional forces are exerted on the heat-shield segment 13. However, it is also conceivable to select the radius r4 in such a way that the situation from FIG. 8 is already reached at a temperature lower than the operating temperature. Then, although additional forces occur at operating temperature, since the existing play has already been used up beforehand, these forces are substantially lower than in the case of a mounting free of play per se. Correspondingly, however, it is also conceivable to provide even greater play than necessary. The bottom arms 17, 25 of the heat-shield segment 13 may be of largely independent design, provided they do not impair the straightening process described. They serve essentially to screen the clamps 12, 14 from the hot gases.

Robust fastening, largely free of thermomechanical loading, of the segments is made possible by the combination of mounting free of play at the end faces and sufficient play for the stretching in the center region of the heat-shield segments. Since the requisite play is produced by a suitable selection of radii of curvature (r3, r4), the segments may be produced in a simple manner as cast parts, which are then ground to the desired radius of curvature with a grinding wheel.

What is claimed is:

1. A heat shield for a gas turbine, which heat shield encloses the rotating blades of a stage of the gas turbine in an annular manner and includes a plurality of heat-shield segments, which are arranged one behind the other in the circumferential direction, are curved in a circular-segment shape and are cooled from outside, and the longitudinal sides of which are designed as correspondingly curved rails running in the circumferential direction and having in each case a first arm projecting in the axial direction, and which, for fastening to the casing of the gas turbine, are mounted with the first arms in each case in an annular intermediate space of constant width, wherein the first arms have a width which varies in the circumferential direction, and is essentially equal to the width of the intermediate spaces at the end faces of the heat-shield segment and decreases toward the center plane of the heat-shield segment, during thermal loading, can straighten unhindered with its first arms in a predetermined region in the intermediate spaces.

2. The heat shield as claimed in claim 1, wherein the intermediate spaces in each case have an outer radius of curvature and an inner radius of curvature, in that the first arms, in the cold state of the heat-shield segment, in each case have an outer radius of curvature and an inner radius of curvature, and in that the two outer radii of curvature are essentially equal and the inner radius of curvature of the first arms is smaller than the inner radius of curvature of the intermediate spaces.

3. The heat shield as claimed in claim 2, wherein the inner radius of curvature of the first arms is selected in such a way that, due to the thermally induced straightening of the heat-shield segment during heating to the operating temperature of the gas turbine, it changes into a radius of curvature which is approximately equal to the inner radius of curvature of the intermediate spaces.

4. The heat shield as claimed in claim 1, wherein the intermediate spaces are in each case formed between an annular carrier for the heat-shield segments and two clamps, which are arranged on both sides of the carrier and engage under the carrier from both sides with ends bent inward in an L-shape.

5. The heat shield as claimed in claim 4, wherein a second arm at a distance from the first arm and running in parallel is provided on the rails of the heat-shield segments below the first arm, so that slots are formed between the parallel first and second arms, and in that the clamps, engage in the slots with the ends bent in an L-shape.

6. A heat shield for a gas turbine, which heat shield encloses the rotating blades of a stage of the gas turbine in an annular manner and includes a plurality of heat-shield segments, which are arranged one behind the other in the circumferential direction, are curved in a circular-segment shape and are cooled from outside, and the longitudinal sides of which are designed as correspondingly curved rails running in the circumferential direction and having in each case a first arm projecting in the axial direction, and which, for fastening to the casing of the gas turbine, are mounted with the first arms in each case in an annular intermediate space of constant width, wherein the first arms have a width which varies in the circumferential direction, and is essentially equal to the width of the intermediate spaces at the end faces of the heat-shield segment and decreases toward the center plane of the heat-shield segment in such a way that the heat-shield segment, during thermal loading, can straighten unhindered with its first arms in a predetermined region in the intermediate spaces, wherein the intermediate spaces are in each case formed between an annular carrier for the heat-shield segments and two clamps, which are arranged on both sides of the carrier and engage under the carrier from both sides with ends bent inward in an L-shape.

* * * * *